US006259674B1

(12) United States Patent
Cole

(10) Patent No.: US 6,259,674 B1
(45) Date of Patent: Jul. 10, 2001

(54) DEVICE AND METHOD FOR AUTOMATIC INITIALIZATION OF A MULTI-MODE INTERFACE CONTROLLER

(75) Inventor: Steven R. Cole, San Jose, CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/126,317

(22) Filed: Jul. 30, 1998

(51) Int. Cl.[7] .............................. H04J 1/16; H04L 12/26
(52) U.S. Cl. ............................. 370/241; 370/389
(58) Field of Search ................... 370/241, 246, 370/351, 357, 359, 395, 419, 431, 458, 503, 377, 389, 254, 401; 379/88.25, 244, 268, 269

(56) References Cited

U.S. PATENT DOCUMENTS

| | | | |
|---|---|---|---|
| 4,736,409 | * 4/1988 | Hasegawa et al. | 379/269 |
| 4,961,187 | * 10/1990 | Gupta | 370/371 |
| 5,226,040 | 7/1993 | Noble | 370/257 |
| 5,386,466 | 1/1995 | Bales et al. | 379/220 |
| 5,517,109 | 5/1996 | Albean | 324/158.1 |
| 5,574,870 | 11/1996 | Abel | 710/129 |
| 5,655,149 | * 8/1997 | Muegge et al. | 710/10 |
| 5,724,347 | * 3/1998 | Bell et al. | 370/377 |
| 5,737,318 | 4/1998 | Melnik | 370/254 |

* cited by examiner

Primary Examiner—Alpus H. Hsu
Assistant Examiner—Brian Nguyen

(57) ABSTRACT

A method of automatically selecting a mode of operation during an initialization sequence of a multi-mode signal controller includes selectively enabling and disabling signal reception and signal driving capabilities and includes monitoring the remaining signal traffic to determine the position of the controller along a communication path. In the preferred embodiment, the signal controller is one of at least two identical signal controllers along a single communication path. For example, the controllers may be components at opposite sides of a telecommunications link of a PBX or other telecommunication system. The structurally identical controllers perform mirror image operations when the controllers are properly initialized to restrict the controllers to different modes of operation. In the initialization sequence for a particular signal controller, the signal reception is monitored to determine whether the controller is receiving a known pattern of system control, such as a universally applied clock signal. Detection of the system control signal clearly identifies the controller as being on the same side of the telecommunications link as the source of the system control signals. On the other hand, the telecommunications link may be monitored for communication signals from the other signal controller. Detection of the communication signals identifies the initializing controller as being on the opposite side of the telecommunications link from the source of the system control signals.

17 Claims, 4 Drawing Sheets

DEVICE AND METHOD FOR AUTOMATIC INITIALIZATION OF A MULTI-MODE INTERFACE CONTROLLER

BACKGROUND OF THE INVENTION

The invention relates generally to a device and method for automatic selective initialization of multi-mode signal controllers located at nodes of a communication system having different interface requirements and, more specifically, to a device and method for automatic selective initialization of a multi-mode signal controller connected to either a private branch exchange (PBX) shelf extension control or a PBX main switch control.

DESCRIPTION OF THE RELATED ART

A PBX serves as a miniature central office for a customer that requires sophisticated local telephony capabilities. For instance, a large business having a campus that includes multiple departments and numerous employees is likely to find it economical to install a PBX to provide intra-campus telephone service and external connections to a public switch telephone network (PSTN) central office. Station lines which connect the PBX switch to the phones of the employees are privately leased or owned and all internal calls are routed through the PBX switch.

In a typical installation of a PBX system, a cabinet houses a host of switching electronics, power supplies, and other computing components. For example, the switching electronics are organized within the cabinet into a number of shelves typically occupying the top portion of the cabinet. Below the switching electronics are the power supply components followed by computer components, including a common control which provides switching functions and system administration for the entire PBX system. A backplane interconnects the various parts of the system, providing data and access control between the switching electronics and the computer.

At times, it is desirable to separate one of the shelves containing switching electronics from the PBX main switch. If a PBX provides telephony for a business which expands to an adjacent building, it might be more cost effective to locate a peripheral shelf at the new building, rather than to equip the new building with an independent PBX system. The peripheral shelf and the main switch can be connected by a fiber optic cable. A first signal controller and a common control are on the main switch side of the fiber optic link, while a second signal controller and a peripheral shelf control are on the peripheral shelf side. The signal controllers perform conversions at the opposite ends of the fiber optic link in order to facilitate communication between the peripheral shelf and the main switch. For instance, the two controllers might communicate information over the fiber optic link in the form of Ethernet packets. The second signal controller at the peripheral shelf side of the link converts signals received from the peripheral shelf control into Ethernet packets to be transmitted to the first signal controller on the main switch side of the fiber optic link. The second signal controller also converts Ethernet packets received from the main switch side signal controller to a format compatible with the peripheral shelf control. The main switch side signal controller performs the opposite format conversions for the common control.

While the two signal controllers perform fundamentally the same functions, the controller operations are mirror images of each other when viewed from the fiber optic link. Each signal controller can be specifically designed to execute its packetizing and depacketizing operations, so that there are two different single-mode controllers that provide the necessary compatibility when connected at the correct ends of the fiber optic link. This requires some duplication of labor in the product design and product manufacture stages of the controllers, but works well for its intended purposes.

Alternatively, a multi-mode signal controller can be designed to allow the controller to be used on either side of the fiber optic link. If the controller is set in one mode, the controller functions as the main switch-side controller described above. On the other hand, the controller can be set in an opposite mode that enables performance of the functions of the peripheral shelf-side controller. Multi-mode signal controllers have the potential of providing significant cost savings.

Care must be taken to ensure that each multi-mode signal controller is properly initialized, based on the side of the fiber optic link on which it is located. Compatibility of switch-side and shelf-side operations is facilitated by providing a universal clock signal. Typically, the clock signal is generated by the common control and transmitted to the peripheral shelf via the fiber optic link. However, if the switch-side controller is improperly set in the second mode during initialization of the controller (i.e., power-up), the controller will be set to receive the clock signal in the fiber optic link, rather than being set to drive the dock signal over the link. At the least, this is likely to render the peripheral shelf inoperable. Moreover, signal conflicts may occur on some channels, as the first and second controllers are both initialized to drive signals over a particular channel. This may cause a system failure.

One method of initializing the multi-mode controllers is to require manual configuration of the settings of the modes. This method requires the presence of a properly trained technician each time that one of the controllers is initialized. Otherwise, the process will be susceptible to error. As a result, the manual setting process may require a significant downtime period each time that initialization is required.

What is needed is a multi-mode signal controller capable of automatic initialization based on the location of the signal controller along a communication path, thereby providing automatic mode selection.

SUMMARY OF THE INVENTION

A method of automatically selecting a mode of operation during an initialization sequence of a multi-mode signal controller includes selectively enabling signal reception and disabling signal driving capabilities of the controller and further includes monitoring the remaining signal traffic to identify the position of the signal controller along a communication path. The identification of the position of the controller along the path is used to determine the desired mode of operation for the controller.

Signal reception at the initializing signal controller is monitored to identify whether the controller is receiving a known pattern of system control (e.g., a clock signal) or is receiving a signal that is indicative of a transmission from a second signal controller (e.g., packetized call information). For example, if the method is executed to first monitor traffic for a signal that is indicative of reception from the second signal controller, detection of the signal identifies the second controller as being operative and being on an end of a communication link opposite to the signal controller undergoing initialization. When this signal is detected, the signal controller undergoing initialization is configured to operate only within a first mode of operation. On the other hand, if the signal is undetected, the method moves to a step of monitoring for a known pattern of system control. For example, the known pattern may be a universal clock signal that synchronizes all the controllers along the communication path. When the known pattern is detected as being received from a source other than the second signal controller, the signal controller undergoing initialization is configured to operate only within a second mode of operation that is compatible with controller performance on a side of a communications link that is common with the source of the known pattern of system control.

In the preferred embodiment, one signal controller is on the same side of the communication link as a control device for generating the known pattern of system control, while the other signal controller is on the same side of the communication link as a controlled device. In the most preferred embodiment, the signal controllers are components of a telecommunications system, such as a PBX, and are structurally identical. However, the structurally identical controllers perform mirror image operations when the controllers are properly initialized to the correct modes.

In the embodiment in which the signal controllers are components of the telecommunications system, the control device may be a conventionally connected common control of a PBX. The controlled device may be a peripheral shelf control for extending the telecommunications capabilities of the system to a remote facility. The telecommunications link may be a fiber optic link, but other transmission media may be utilized.

Each signal controller includes circuitry for disabling all outgoing signals that jeopardize system performance when the controller is set in the incorrect mode. Preferably, all signal drivers are disabled during the initialization sequence. Each signal controller also includes recognition circuitry or software for detecting the incoming signals (e.g., clock signals or packetized call information) that identify the position of the controller along the communication path. A mode control switches the controller into the correct mode when the position is identified by detection of signals.

In the preferred embodiment, the initialization sequence begins with disabling at least selected signal driving capabilities and selectively enabling signal recognition capabilities. For example, the signal recognition capability for detecting packetized call information may be activated to determine if the signal controller undergoing initialization is receiving packets from an operating remote signal controller. If the packets are detected, the position of the controller is identified and the proper mode is implemented. On the other hand, if the packets are not detected, alternate signal recognition capability is activated to detect the presence or absence of known control signals, such as clock signals. If the known control signals are received independently from the telecommunications link, the position of the controller is identified and the proper mode is implemented. While not critical, the signal controller may be designed such that mode implementation is merely the activation of one of two mode interfaces and the deactivation of the other mode interface. The mode interfaces may be alternate sets of signal drivers and signal receivers.

DETAILED DESCRIPTION

Figure 1:
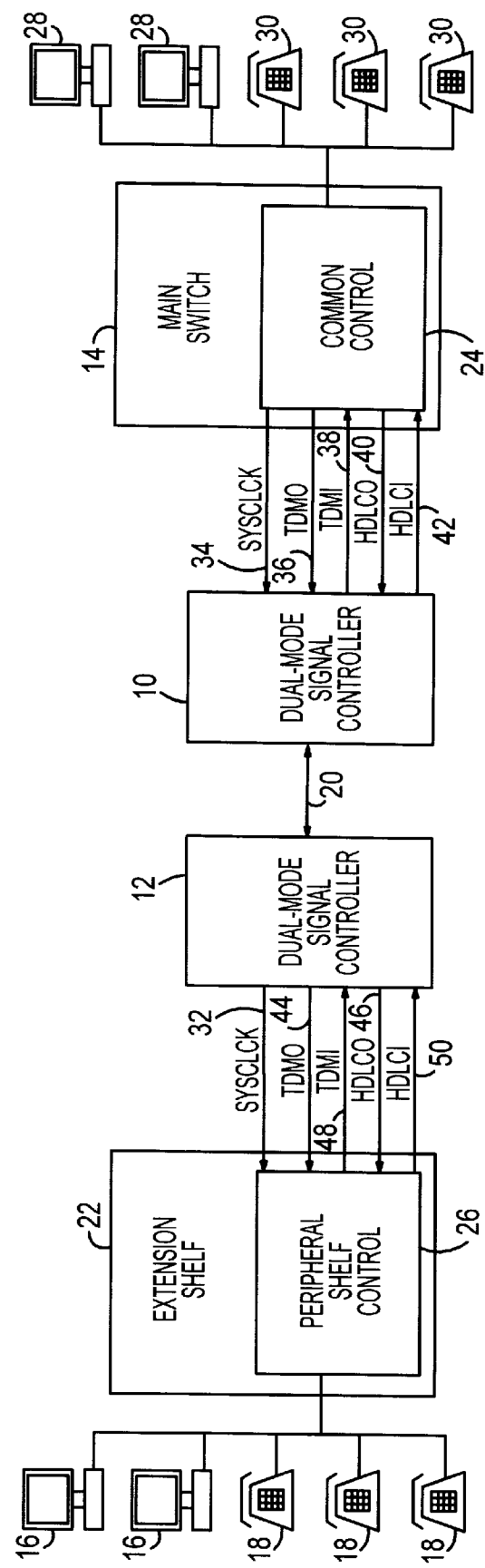
FIG. 1 is a block diagram of a telecommunications system, such as a PBX, having dual-mode signal controllers for supporting telecommunications via a remote peripheral shelf.

With reference to FIG. 1, a telecommunications system employs dual-mode signal controllers 10 and 12 to enable a main switch 14 to support telecommunications capability at a number of remotely located computers 16 and telephones 18. The dual-mode signal controllers are located on opposite sides of a communication link 20, such as a fiber optic link. The signal controllers provide signal conversions between a first format for transmitting information over the link 20 and a second format for processing at the main switch 14 and the shelf extension subsystem 22.

After the telecommunications system of FIG. 1 has been properly initialized, the components operate in a conventional manner. That is, the invention relates to initializing the system, and particularly relates to initializing the dual-mode signal controllers 10 and 12 to establish the appropriate modes.

The dual-mode signal controllers 10 and 12 provide the telecommunications system with signal conversion capability. The signals generated by a common control 24 of the PBX main switch 14 can be converted into Ethernet packets, for example, which are transmitted over the fiber optic link 20 to a peripheral shelf control 26. As is well known in the art, the extension shelf subsystem 22 having the peripheral shelf control 26 is functionally equivalent to the conventional shelves contained within a cabinet that houses the common control 24 of the main switch 14. The shelf extension subsystem 22 is used to extend the capabilities of the PBX by a limited distance when some of the PBX-supported computers 16 and telephones 18 are not on the same site as the main switch 14. Typically, the extension shelf subsystem 22 must be within twenty miles of the main switch 14, but this is not critical to the invention to be described below. While the invention is illustrated and described as being used with a PBX system, the initialization sequence may be practiced with any communication system requiring two or more linked controllers that operate in different modes, depending upon the locations of the controllers along the communication path.

The interaction between the main switch 14 and the extension shelf subsystem 22 enables communication between the remotely located computers 16 and telephones 18, as well as communication with local computers 28 and local telephones 30. While not shown in FIG. 1, the switch is connected to other networks, such as a PSTN and/or the global Internet, to enable communication with computers, telephones and other devices that are not supported by the PBX.

In the preferred embodiment, the dual-mode signal controllers 10 and 12 are structurally identical. However, the controllers are initialized into different modes of operation. For a signal that is directed to one of the remote telephones 18 from the main switch 14, the first signal controller 10 converts the signal from a first format that is compatible with processing within the main switch to a second format that is compatible with transmitting via the communication link 20. For example, the signal may be packetized to an Ethernet format by the first signal controller. The second signal controller 12 then receives the packet or packets and reformats the signal to a format that is compatible with processing via the extension shelf subsystem 22 that is connected to the target telephone 18. Thus, with respect to the signal, the second signal controller has the mode of operation that is the opposite of the first signal controller.

The modes of operation of the signal controllers 10 and 12 are set during initialization sequences of the controllers. For example, following installation at the local site that includes the first signal controller 10, the controller must be initialized when power is available. Setting the controller in the proper mode is critical to operation of the main switch 14. In fact, under some circumstances, improperly initializing the first signal controller can cause a full system failure. If the switch-side signal controller 10 is improperly initialized, the controller 10 might drive signals into the channel 34. The resulting signal collisions would likely cause a system failure within the PBX. A limited number of other channels are shown in FIG. 1. At the switch-side signal controller 10, the controller is configured to receive time division multiplexed output (TDMO) signals over channel 36 and high level data link control output (HDLCO) signals over channel 40 and to transmit the signals via the fiber optic link 20 to the shelf-side signal controller 12. The switch-side signal controller 10 is also initialized to drive time division multiplexed input (TDMI) signals and high level data link control input (HDLCI) signals received via the fiber optic link 20 to the common control 24 via channels 38 and 42, respectively.

The shelf-side signal controller 12 is initialized to drive the SYSCLCK signals, the TDMO signals, and the HDLCO signals received from the switch-side signal controller 10 to the peripheral shelf control 26 via channels 32, 44 and 46, respectively. In addition, the signal controller 12 receives TDMI signals and HDLCI signals via channels 48 and 50, respectively.

If one of the signal controllers 10 and 12 is improperly initialized, "backdriving" may occur. Backdriving is the driving of input signals into output transmission channels. This will degrade the performance of the system and may cause a system failure.

Figure 2:
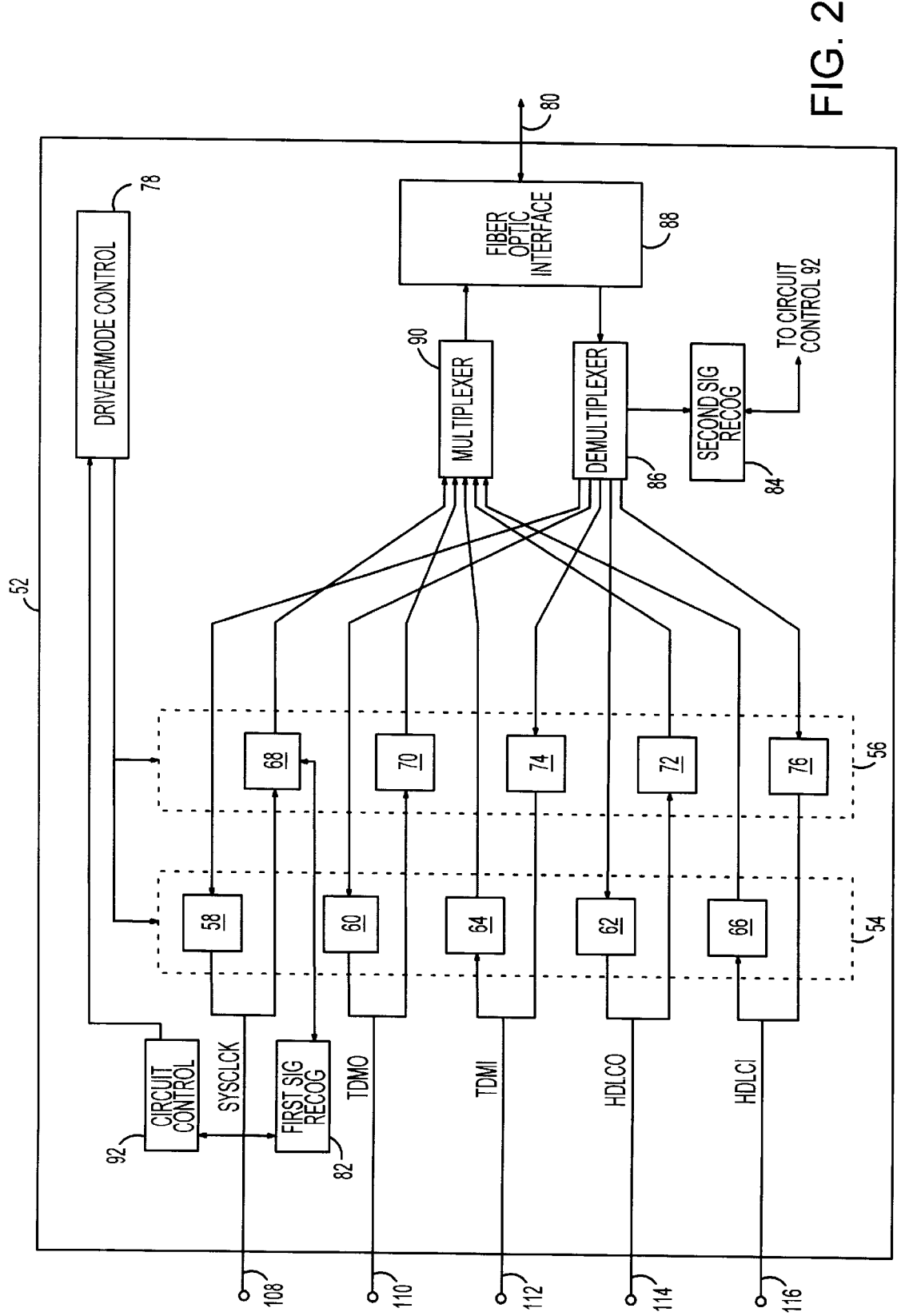
FIG. 2 is a block diagram of key operational components of one of the dual-mode signal controllers of FIG. 1, in accordance with the invention.

With reference to FIG. 2, a dual-mode signal controller 52 is shown as including a shelf control interface 54 and a common control interface 56. Both of the interfaces are included within the signal controller 52 to allow the controller to be used as either the switch-side controller 10 or the shelf-side controller 12 of FIG. 1. That is, if the controller 52 is to be used in the location of controller 12 in FIG. 1, the shelf control interface 54 is activated and the common control interface 56 is disabled. On the other hand, if the controller 52 is to be used as the switch-side signal controller 10 of FIG. 1, the common control interface 56 is enabled and the shelf control interface 54 is disabled.

Each of the interfaces 54 and 56 includes a set of signal drivers and receivers. For the shelf control interface 54, the set includes a SYSCLCK signal driver 58, a TDMO signal driver 60, an HDLCO signal driver 62, a TDMI signal receiver 64 and a HDLCI signal receiver 66. On the other hand, the common control interface 56 includes a SYSCLCK signal receiver 68, a TDMO signal receiver 70, an HDLCO signal receiver 72, a TDMI signal driver 74 and a HDLCI signal driver 76.

A driver/mode control device 78 is used during the initialization of the controller 52. At the outset of the initialization sequence the driver/mode control device 78 disables each of the drivers 58, 60, 62, 74 and 76. However, the receivers 64, 66, 68, 70 and 72 may remain enabled during the initialization sequence. Signal inputs to the signal controller 52 are monitored to determine whether the controller is located on the shelf side or the switch side of a communications link 80, such as a fiber optic link. If the signal controller is on the shelf side of the communications link, signals will be received from a signal controller on the opposite side of the communications link. Thus, the shelf control interface 54 must be activated in order to provide SYSCLCK signals to the extension shelf subsystem 22 of FIG. 1. Simultaneously, the common control interface 56 must be disabled to prevent signals from being backdriven.

When the signal controller 52 is on the switch side of the communications link 80, no signals will be received via the link, since the extension shelf system is without SYSCLCK signals. The fact that the signal controller is on the switch side of the telecommunications system can be confirmed by monitoring one or more connections with the common control 24 of FIG. 1 in order to detect known patterns of control signals that are unique to the common control. For example, the common control generates the SYSCLCK signals, so that for the receiver 68 of the common control interface 56 to receive SYSCLCK signals, the controller must be at the common control side of the communications link. Thus, the driver/mode controller 78 enables the common control interface 56 and fully disables the shelf control interface 54.

A first signal recognition device 82 is connected to the SYSCLCK signal receiver 68 to monitor signal reception at the receiver. The first signal recognition device 82 is used to monitor SYSCLCK input during a portion of the initialization sequence of the controller 52. A second signal recognition device 84 is connected to monitor traffic at a demultiplexer 86 connected to a fiber optic interface 88. The combination of the interface 88 and the demultiplexer 86 is used to depacketize and reassemble data streams upon receiving Ethernet packets over the communications link 80. This process is not critical to the invention and may be substituted with other techniques known in the art. A combination of a multiplexer 90 and the fiber optic interface 88 performs the opposite operations, i.e., receives data streams from receivers 64, 66, 68, 70 and 72 and provides format conversion into Ethernet packets that are transmitted over the communications link 80.

The first and second signal recognition devices 82 and 84 may be implemented in computer hardware, software or a combination of hardware and software. The devices are activated and deactivated by a circuit control member 92. In one possible initialization sequence, the driver/mode control device 78 disables signal drivers 58, 60, 62, 74 and 76, while the circuit control member 92 activates the second signal recognition device 84 and deactivates the first signal recognition device 82. Traffic from the communications link 80 is monitored by means of the connection of the second signal recognition device 84 to the demultiplexer 86. If traffic indicates that the fiber optic interface 88 is receiving signals from a remote dual-mode signal control, the shelf control interface 54 is activated and the common control interface 56 is deactivated. On the other hand, if the second signal recognition device does not detect the appropriate packets, the device 84 is deactivated and the first signal recognition device 82 is activated. The first signal recognition device 82 monitors for SYSCLCK signals driven by the common control. If the SYSCLCK signals are recognized, the signal controller 52 must be at the switch side of the communications link 80. Thus, the common control interface 56 is enabled and the shelf control interface 54 is disabled.

While the initialization sequence has been described as activating the second signal recognition device 84 for a preselected time interval before activation of the first signal recognition device 82, the reverse may be executed. In fact, both of the signal recognition devices may be activated simultaneously. Referring briefly to FIG. 1, if both of the signal controllers 10 and 12 are initialized at the same time, fixed system control signals (e.g., SYSCLCK signals) driven by the common control 24 will be present, while no packets will be transmitted across the communications link 20. Consequently, the switch-side controller 10 must complete its initialization sequence before the shelf-side controller 12 will receive signals.

Figure 3:
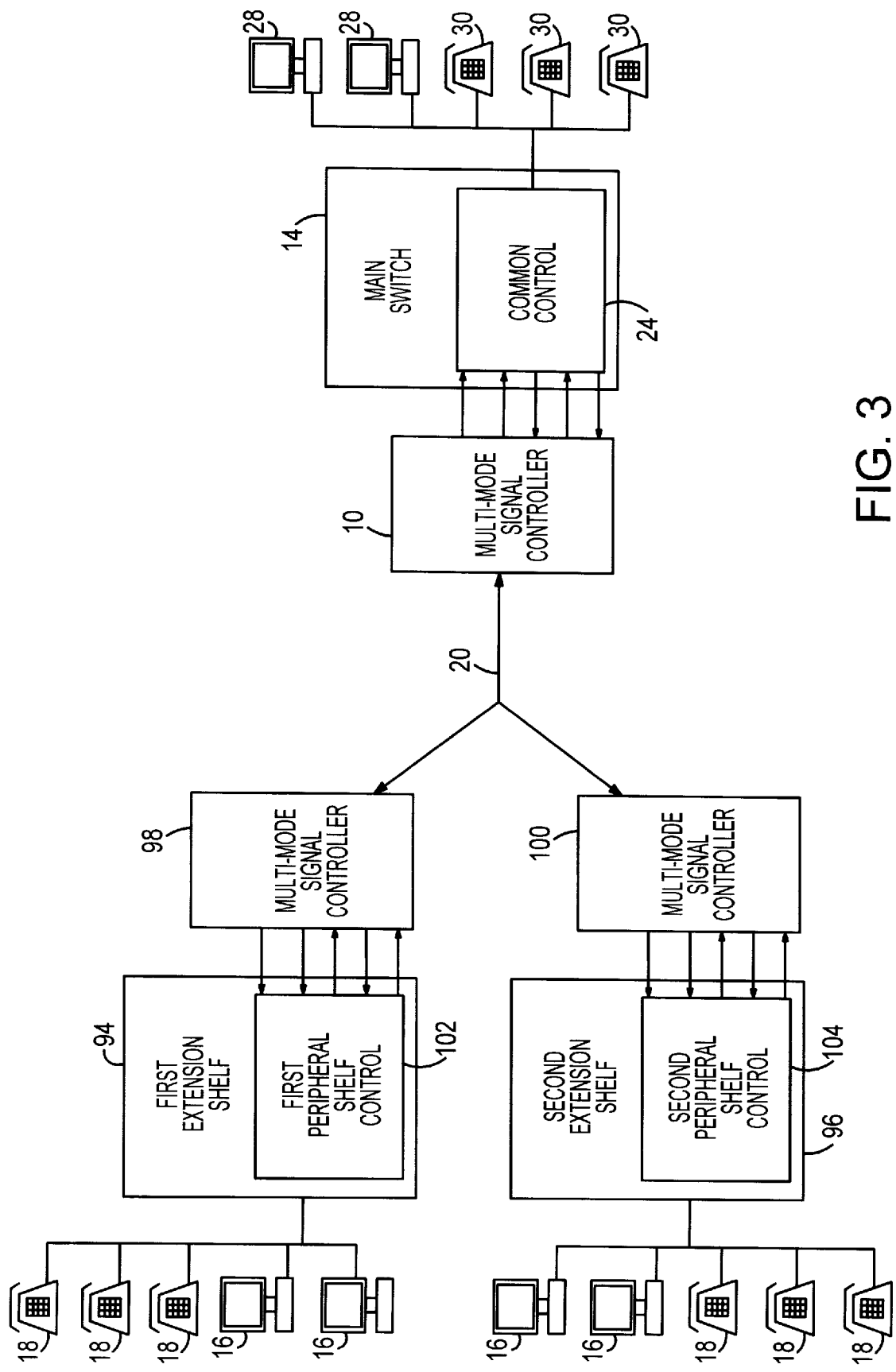
FIG. 3 is a block diagram of a telecommunications system having multiple dual-mode signal controllers in accordance with the invention.

Referring now to FIG. 3, a telecommunications system may include more than one extension shelf subsystem 94 and 96 that need to be individually addressable by the signal controller 10 at the main switch 14. This may require more than two modes of operation by the signal controllers 10, 98 and 100. Thus, if the three signal controllers are to be interchangeable, each controller must be capable of operating in any one of three modes.

The initialization sequence for the switch-side signal controller 10 may be implemented in the same manner as described with reference to FIGS. 1 and 2. Thus, a receiver of a known pattern of system control signals (e.g., SYSCLCK signals) may be monitored. Detecting the known pattern of control signals as having arrived independently of the communications link 20 is evidence that the initializing signal controller 10 is on the same side of the link 20 as the main switch 14.

Initializing the remote multi-mode signal controllers 98 and 100 is more problematic. In some applications, the signal controller 98 that is connected to the first extension shelf subsystem 94 requires a mode of operation that is different than the mode of the signal controller 100 that is connected to the second extension shelf subsystem 96. To provide additional information necessary for proper initialization, the common control 24 can be configured to transmit signals to both remotely located signal controllers 98 and 100, such that the signals indicate the interface requirements of first and second peripheral shelf controls 102 and 104, respectively. For example, the HDLCO signals which the common control directs to the first signal controller 98 can be modified to be distinguishable from the HDLCO signals directed to the second signal controller 100. Upon recognizing a first modified HDLCO signal, the first signal controller 98 is programmed to initialize a proper one of three modes of operation. On the other hand, signal monitoring at the other signal controller 100 may be used to identify the position of the controller 100 for automatically initializing the controller into a third mode of operation.

Figure 4:
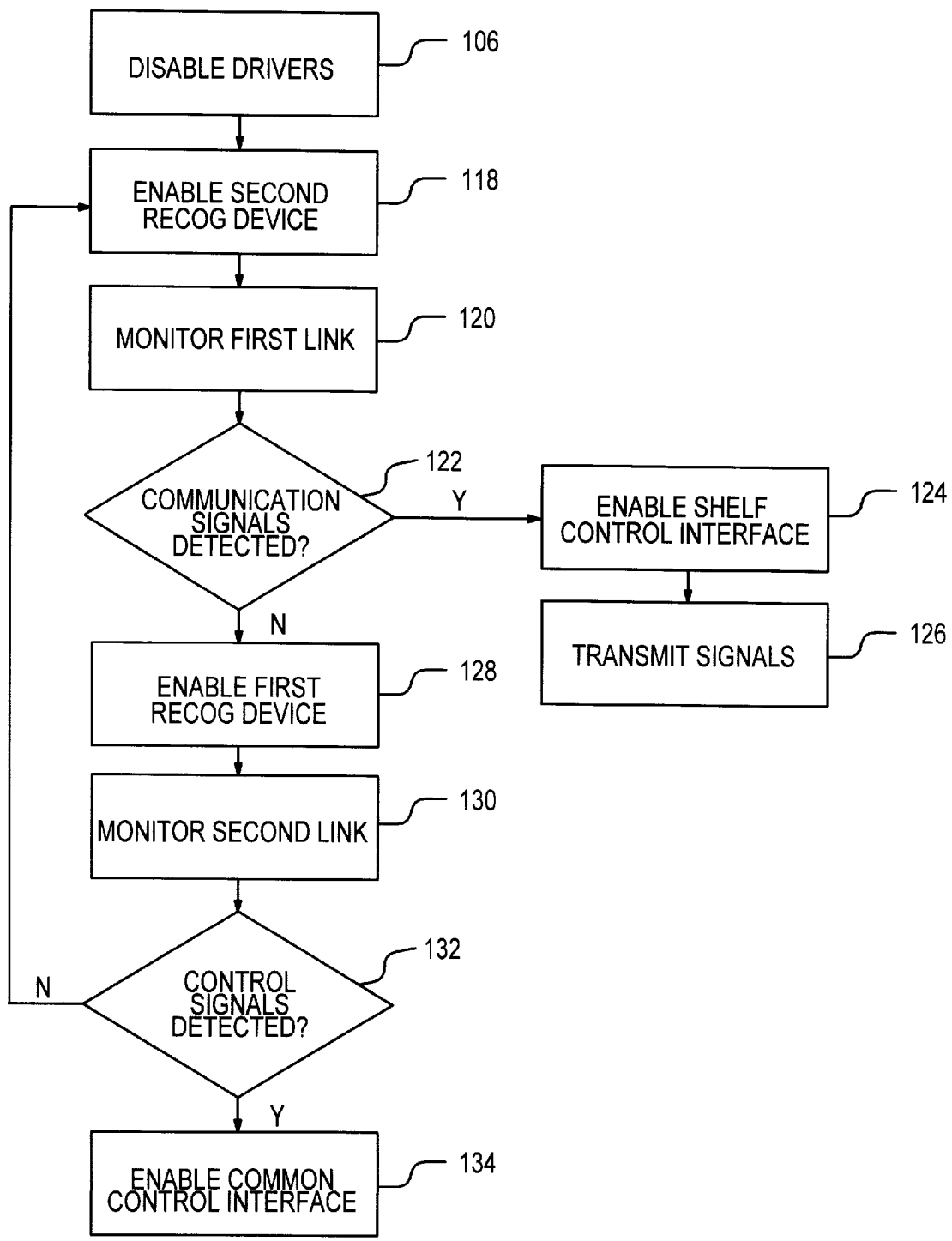
FIG. 4 is a process flow of a method for automatically initializing one of the signal controllers of FIGS. 2 or 3.

With reference to FIGS. 1, 2 and 4, a method for automatically initializing the multi-mode signal controller 52 for proper operation on one side of the communications link 20 of FIG. 1 includes the step 106 of disabling the drivers 58, 60, 62, 74 and 76. Disabling the drivers prevents backdriving of signals along lines 108, 110, 112, 114 and 116. The signal drivers may be disabled by the driver/mode controller 78 simply by providing a high impedance state at the drivers.

In step 118, the recognition circuitry for monitoring activity is enabled. In one embodiment, the second signal recognition device 84 is activated for a preselected period of time to monitor traffic received via the communications link 80. The monitoring process is shown as step 120 in FIG. 4. However, in another embodiment the monitoring process of step 120 occurs simultaneously with the monitoring process of step 130 to be described below.

If traffic is detected along the communications link 80 by the second signal recognition device 84, a positive response is generated at step 122 and the shelf control interface 54 is enabled, while the signal drivers and receivers 68, 70, 72, 74 and 76 of the common control interface 56 are disabled. Thus, the signal driver 52 operates in a mode of operation that is compatible with use of the controller in the position of the signal controller 12 of FIG. 1. That is, the step 124 of enabling the shelf control interface allows the controller to be used with the extension shelf subsystem 22 of FIG. 1. The controller can then be used to transmit signals between the peripheral shelf control 26 and the switch-side signal controller 10, as shown at step 126.

When no communication signals are detected by the second signal recognition device 84, a negative response is generated at the decision step 122. The circuit control member 92 of FIG. 2 executes step 128 of enabling the first signal recognition device 82. This automatically implements the step 130 of monitoring a second link. In FIG. 2, the second link is the connection to SYSCLCK receiver 68 that is connected to the source of SYSCLCK signals when the signal controller 52 is on the same side of the communications link 80 as the main switch of a telecommunication system. Thus, in the decision step 132, if the SYSCLCK signal is detected, the signal controller is in the position of the controller 10 of FIG. 1. The common control interface 56 is then enabled at step 134. On the other hand, if a negative response is generated at the decision step 122, the process returns to the step 118 of enabling the second signal recognition device 84. The process continues to loop until one of the two links provides a detectable signal for identifying the position of the signal controller 52 along the communication path that includes the controller. In a circumstance in which both of the signal controllers 10 and 12 of FIG. 1 are simultaneously initialized, the return of the process to step 118 from the decision step 132 is important, since the shelf-side controller 12 is unlikely to receive either communication signals at step 122 or control signals at step 132 until the switch-side signal controller 10 has been completely initialized.

While the process of FIG. 4 has been described as one in which the second signal recognition device 84 is utilized before the first signal recognition device 82, this is not critical. In some applications, there may be benefits to monitoring the signal reception for the known pattern of control signals prior to monitoring the link to a remote signal controller for the reception of communication signals.

What is claimed is:

1. A method of automatically selecting a mode of operation during initialization of a first multi-mode signal controller for which a desiered mode of continued operation is based on a position of said first signal controller along a communication path that includes a second multi-mode signal controller, said method comprising steps of:

enabling signal reception at said first signal controller while disabling at least a portion of signal driving capability from said first signal controller;

monitoring said signal reception to detect one of a first signal and a second signal, where said first signal is specific to a communication with said second signal controller and where said second signal is specific to a known pattern of system control;

configuring said first signal controller to operate only within a first mode of operation if said first signal is detected; and configuring said first signal controller to operate only within a second mode of operation if said second signal is detected.

2. The method of claim 1 wherein (1) said step of configuring said first signal controller to operate only within said first mode includes enabling a first mode interface and disabling a second mode interface, (2) said step of configuring said first signal controller to operate only within said second mode includes enabling said second mode interface and disabling said first mode interface, and (3) said step of disabling at least a portion of said signal driving capability includes disabling each of a plurality of signal drivers of said first and second mode interfaces.

3. The method of claim 1 wherein said steps of monitoring said signal reception and configuring said first signal controller are executed such that said first signal controller is initialized to a mode of operation opposite of a mode of operation of said second signal controller.

4. The method of claim 1 further comprising a step of connecting said first signal controller within said communication path such that said first signal controller is connected to one of a system control device and a system controlled device while said second signal controller is connected to the other of said system control and controlled devices, said known pattern of system control being a signal generated by said system control device such that detection of said known pattern of signal control is indicative that said first signal controller is connected to said system control device.

5. The method of claim 4 wherein said step of connecting said first signal controller includes selecting said first signal controller to be substantially a duplication of said second signal controller.

6. The method of claim 4 wherein said step of connecting said first signal controller is executed such that said system control device is a common control of a telecommunications system and said system controlled device is a peripheral shelf control.

7. The method of claim 6 wherein said steps of monitoring said signal reception for said first and second signals respectively includes detecting packetized signals from said second signal controller and detecting system clock signals from said common control.

8. A signal processing system comprising:
a control device for generating control signals;
substantially identical first and second signal controllers connected on opposite sides of a communication link, each of said signal controllers being switchable between a first mode that is compatible with connection to said control device on a same side of said link as said control device and second mode that is compatible with connection to said link on a side opposite to said control device; and
signal recognition circuitry included with each of said first and second signal controllers, said signal recognition circuitry being activated during each initialization sequence of said first and second signal controllers for restricting operation of a first one of said first and second signal controllers to said first mode in response to detecting reception of said control signals independently of said link and for restricting operation of a second one of said first and second signal controllers to said second mode in response to detecting signals specific to communications from said first one via said link.

9. The system claim 8 further comprising means for suspending signal driving capability with respect to a particular one of said first and second signal controllers when said particular one is in said initialization sequence.

10. The system of claim 8 further comprising a controlled device on a same side of said link as said first and second signal controller that is restricted to operation in said second mode.

11. The system of claim 10 wherein said controlled device is a peripheral shelf control of a telecommunications system, said link being a telecommunications link that is compatible with handling calls.

12. The system of claim 11 wherein said control device is a common control of a private branch exchange (PBX) that includes said peripheral shelf control.

13. A multi-mode signal controller capable of automatic initialization comprising:
an interface compatible with connection to a telecommunications link for handling packets of call information;
signaling means for driving and receiving signals, said signaling means having a first mode for directing selected control signals for output via said telecommunications link and having a second mode for directing said selected control signals for output independently of said telecommunications link;
a packet recognizer configured for detecting reception of said packets via said interface;
a control signal recognizer for detecting reception of at least one of said selected control signals independently of said telecommunications link; and
an initialization device, responsive to said packet recognizer and said control signal recognizer, for initializing said signaling means in said second mode in response to detection of reception of said packets via said interface and for initializing said signaling means in said first mode in response to detection of reception of said at least one of said selected control signals independently of said telecommunications link.

14. The signal controller of claim 13 further comprising means for suspending driving of said selected control signals via said signaling means until said initialization device sets said signaling means in one of said first and second modes.

15. The signal controller of claim 13 wherein said signaling means includes a first set of drivers/receivers that is activated when said signaling means is in said first mode and includes a second set of drivers/receivers that is activated when said signaling means is in said second mode.

16. The signal controller of claim 13 wherein said control signal recognizer is configured to detect a clock signal, said clock signal being said at least one selected control signal.

17. The signal controller of claim 13 wherein said interface is connected to a private branch exchange via said telecommunications link.

* * * * *